United States Patent [19]

Baker et al.

[11] Patent Number: 5,680,511
[45] Date of Patent: Oct. 21, 1997

[54] SYSTEMS AND METHODS FOR WORD RECOGNITION

[75] Inventors: Janet M. Baker, West Newton; Laurence S. Gillick, Newton; James K. Baker, West Newton; Jonathan P. Yamron, Sudbury, all of Mass.

[73] Assignee: Dragon Systems, Inc., Newton, Mass.

[21] Appl. No.: 477,287

[22] Filed: Jun. 7, 1995

[51] Int. Cl.⁶ .................................................. G10L 9/00
[52] U.S. Cl. ...................... 395/2.66; 395/2.64; 395/2.6
[58] Field of Search .................... 364/419.02, 419.03, 364/419.08; 395/2.6, 2.61, 2.64, 2.66, 2.4, 2.44, 2.79, 2.69, 2.86, 2.85, 2.52, 2.84

[56] References Cited

U.S. PATENT DOCUMENTS

| | | | |
|---|---|---|---|
| 4,674,065 | 6/1987 | Lange et al. | 382/511 |
| 4,805,219 | 2/1989 | Baker et al. | 381/43 |
| 4,823,306 | 4/1989 | Barbic et al. | 395/600 |
| 4,916,614 | 4/1990 | Kaji et al. | 364/419.03 |
| 5,202,952 | 4/1993 | Gillick et al. | 395/2 |
| 5,267,345 | 11/1993 | Brown et al. | 395/2.64 |
| 5,329,609 | 7/1994 | Sanada et al. | 395/2.6 |
| 5,500,920 | 3/1996 | Kupiec | 395/2.79 |
| 5,526,259 | 6/1996 | Kaji et al. | 364/419.03 |
| 5,541,836 | 7/1996 | Church et al. | 364/419.07 |

FOREIGN PATENT DOCUMENTS

| | | |
|---|---|---|
| 0540328 | 5/1993 | European Pat. Off. |
| 2 192 746 | 1/1988 | United Kingdom . |
| 2 240 203 | 7/1991 | United Kingdom . |

OTHER PUBLICATIONS

Raymond Lau et al., "Trigger-Based Language Models: A Maximum Entropy Approach", ICASSP, vol. II, pp. II-45–II-48 (1993).

Ronald Rosenfeld et al., "Improvements in Stochastic Language Modeling", ARPA Speech & Natural Language Workshop, School of Computer Science, pp. 107–111, (1992).

Raymond Lau et al., "Adaptive Language Modeling Using the Maximum Entropy Principle", IBM Research Division, undated.

*Primary Examiner*—Krista M. Zele
*Assistant Examiner*—Daniel S. Hunter
*Attorney, Agent, or Firm*—Thomas J. Engellenner; Lawrence E. Monks; Lahive & Cockfield, LLP

[57] ABSTRACT

In one aspect, the invention provides word recognition systems that operate to recognize an unrecognized or ambiguous word that occurs within a passage of words. The system can offer several words as choice words for inserting into the passage to replace the unrecognized word. The system can select the best choice word by using the choice word to extract from a reference source, sample passages of text that relate to the choice word. For example, the system can select the dictionary passage that defines the choice word. The system then compares the selected passage to the current passage, and generates a score that indicates the likelihood that the choice word would occur within that passage of text. The system can select the choice word with the best score to substitute into the passage. The passage of words being analyzed can be any word sequence including an utterance, a portion of handwritten text, a portion of typewritten text or other such sequence of words, numbers and characters. Alternative embodiments of the present invention are disclosed which function to retrieve documents from a library as a function of context.

43 Claims, 5 Drawing Sheets

SYSTEMS AND METHODS FOR WORD RECOGNITION

BACKGROUND OF THE INVENTION

This invention relates generally to methods and systems for word recognition, and, more particularly, to methods and systems that employ context and meaning to recognize a word, or a series of words.

Human beings are remarkably adept at manipulating sounds and images to communicate information. However, computers only communicate with information that is encoded as numerical data, most commonly a series of binary numbers. Therefore, to enter information, such as words, letters and numbers into a computer, the information must first be translated into machine-readable form.

Keyboard data entry is the conventional procedure for translating information into a computer-readable format. During a typical keyboard data entry process a computer operator types data, such as words and numbers, into the computer, and the keyboard generates a binary code for each key that is pressed. Therefore, the operator uses the keyboard to translate the data into a machine-readable format. Although keyboard data entry is a reliable procedure for entering data into a computer, it is a relatively time consuming and labor intensive process.

Word recognition, such as speech recognition or character recognition, is an alternative procedure for entering commands and information into a computer. In a word recognition procedure, an automated system recognizes each word by its sound, the shape of its letters, or some other characteristic, and generates the appropriate numerical data code. For example, during a speech recognition process, an operator dictates information into the computer and the computer recognizes the sounds of each word and enters the information into the computer, just as if the data were being typed. Similarly, in a character recognition process where there is handwritten input or an operator scans a document into a computer, the computer recognizes the shape of each character and generates the appropriate binary code as if the document were being retyped into the computer.

These recognition processes offer tremendous advantages over the conventional keyboard entry procedure. For example, speech recognition systems eliminate the need for typing and allow physically-challenged persons to operate computer automated equipment without having to key in data through a keyboard. Similarly, optical character recognition systems make clerical work more efficient by collecting data directly from documents without having to retype the documents into the computer.

In operation, a recognition system must first recognize each word or sequence of words in a document or in a speech before translating the word or words into the binary coded sequence. A basic word recognition system recognizes the words in a document or a speech on a word-by-word basis and analyzes each word individually, and sometimes independently, from the other words in the document. For example, a conventional character recognition system will separately analyze each word in a document to input the document one word at a time. Similarly, even complex word recognition systems, such as continuous speech systems, attempt to parse an utterance of speech into a series of individual words. Accordingly, these systems may analyze each word in isolation from the other words in the document or speech. Although these word-by-word systems generally work well, a major problem with these systems is that they are highly dependent on the quantity and quality of information available for each word in the document or speech.

Scientists have implemented context recognition procedures and systems that reduce the dependency of word recognition systems on the quality and quantity of information available for each word being analyzed. A context recognition system analyzes the known words in a word string to identify other words which are likely to occur in sequence with these known words. Conventional context recognition systems rely on data intensive language models to identify such other words. These language models are essentially statistical probability models that include a set of hypotheses as to what words are likely to appear in association with other words.

These statistical probability models typically include probability data collected by observing the frequency at which actual sequences of words occur in a set of documents, typically called the training data. Such a recognition system can employ these probabilities to help predict the next word in a sequence of words.

Accordingly, a basic concept in language modeling is to relate the current sentence or word sequence being analyzed to "similar" sequences which have been previously observed. However, prior art techniques based on this basic concept have significant limitations in their ability to compute and represent language knowledge. A fundamental difficulty arises because the number of all possible word sequences is impractically large. There are also difficulties in setting a practical definition for sequences to be "similar".

For example, the phrase in the previous paragraph: "a basic concept in language modeling . . . " might be said to be "similar" to all of the following:

1) A fundamental concept in language modeling

2) A concept in statistical language modeling

3) One key idea in the study of language

4) An important linguistic paradigm

One known language model, the word n-gram language model, identifies similar sequences by counting sequences of n words. With the n-gram language model, two word sequences are "similar" only if they are identical. Thus, among the above sample sequences, the only similarity recognized in example (1) is the sub phrase "concept in language modeling" and the only similarity in example (2) is the two word phrase "language modeling." No similarities exist in examples (3) and (4). Clearly, a word n-gram language model can miss most of the relationship between the word sequence being analyzed and similar observed phrases.

An additional problem with the word n-gram language model is that the number of possible word n-grams grows very large with increasing values of n. With a 60,000 word vocabulary the number of word pairs (bigrams) is 3.6 billion and the number of 3-grams is 216 trillion. If the counting of the word n-grams were generalized to use a broader definition of "similarity" of word sequences, it just makes the problem of representing the counts of observed sequences worse.

A prior art language model that has a broader definition of "similarity" than the word n-gram language model is the "semantic categories n-gram language model." In statistical modeling of sequences of semantic categories, each word in a sequence being analyzed is replaced by a label which represents some syntactic or semantic properties of the word. For example, in phrase (1) above, the word "fundamental" might be the same semantic category as "basic" and so the entire sequence would be judged to be similar to the original phrase. In example (2), the deletion of the word "basic" and the insertion of the word "statistical" causes problems. Starting from the sample phrase, it is easy to generate phrases by deleting words, however, the number of phrases generated by all possible insertions is again overwhelming. Thus it is difficult to generalize prior art semantic category n-gram systems to properly model insertions and deletions.

Category n-gram systems have even more difficulty with examples (3) and (4). A category system might be able to form an association between "A basic concept" and "One key idea," but an n-gram system has no way to relate "the study of . . . " to ". . . modeling," and cannot handle the word order reversal. Category n-grams get little, if any, information from example (4).

Therefore, even though the category n-gram model allows a broader definition of similarity than word n-grams, they still do not allow the representation of anything approaching the full richness of language. Semantic categories also have another weakness which is separate from the limitations of n-gram methods in general. By definition, semantic category methods classify words into a finite set of "categories." The ability to represent sequences and n-grams with larger values of n can only be achieved by having the number of categories be much less than the number of words in the vocabulary. However, the actual semantic relationships in any natural language cannot be represented by any fixed partition into a limited number of categories. Words can be related to each other in a wide variety of ways. There is no set of words in which all the member words are all similar to each other and are not similar, in any way, to any word outside the set. Yet, the whole notion of categories, is predicated on the assumption that the entire vocabulary can be broken up into such sets.

However, there is a significant distinction between the notion of "semantic similarity" and the notion of "semantic categories". It is possible to say that two words are closely related and even put a quantitative measure on the degree of similarity. The problem comes in trying to encode such a similarity measure into a fixed set of categories. When all the different ways in which two words can be related are taken into account, it can be seen that the similarity function must depend on the actual identities of the two words. It is not understood to be possible to replace any set of words with any category label without loss of significant information.

Prior art methods like the n-gram language model, which rely on precomputed statistical counts, have the additional practical limitation of inherently requiring that the set of word sequences be mapped into a limited number of memory spaces or "bins." Whether the bins are determined by the identity of the word n-gram, by semantic categories, or by other means, the total number of bins is limited by the amount of available storage space, either computer memory (RAM) or disk storage. Consequently, these statistical language models require large amounts of permanent computer memory.

Another problem with existing language models is that they require substantial training to identify sufficient language characteristics to make feasible a context-based recognition system. Typically, training is done by analyzing the occurrence of words within machine-readable text and using the analyzed data to build a language model. However, to accurately model a system as extensive and as complex as general English, volumes and volumes of text, discussing many different topics, must be analyzed. As such, these language models require considerable off-line training to input and to analyze the contents of the training data.

This need for extensive off-line training creates another problem. In particular, successful off-line training is heavily dependent on a supply of training data sufficient to generate an adequate vocabulary of known words and adequate models of recognized language characteristics. However, sufficient training data is not always available, and the lack of useful training data is particularly acute for many important applications, such as applications in the scientific, medical or legal fields. Each field can have an extensive list of application-specific terms and meanings. In these cases, it is necessary to have extensive amounts of specific text, so that the language model can analyze sufficient statistical data to generate meaningful language characteristics and to have a sufficient vocabulary. When adequate training data is not readily available, it typically must be created by either entering data at a keyboard or translating data into a machine readable format by input into a recognition system. The production of training data adds to the expense and the time of developing language models.

Another constraint is that the available training data must accurately reflect the language being modeled to achieve high performance. For example, Dow Jones makes available an extensive amount of machine readable text from The Wall Street Journal. However, the text is skewed to emphasize financial terms and meanings, and is likely to overemphasize the correlation between the words "bank" and "loan" at the expense of the correlation between the words "bank" and "river". Additionally, the characteristics particular to a text can skew the language model, such as overemphasizing the correlation of the word "new" with the word "york". Therefore, the training data must be selected carefully and, if necessary, examined and edited so that it more accurately models the type of language. This is a time consuming and labor intensive process that greatly increases the expense and time associated with context word recognition systems.

Additionally, these conventional training techniques and their associated language models are difficult to adapt or edit. For instance, each new word, such as "obviousness", requires sufficient training text and analysis to develop a meaningful statistical model of the word. Therefore, each time a new word is added to the language model, new training data must be obtained or developed. This can be particularly burdensome in new fields of science, where new terms have a precise meaning but very little textual material is available that uses the term.

Moreover, these context models require a statistical analysis of the interrelationship between new words and already known words. To do this these systems must update the words in the model each time a new word is added to the vocabulary. This may require that the system be taken off-line, trained with the new data, tested and updated. This cumbersome process makes it difficult and impractical to develop such language models that are applicable in rapidly changing fields, such as computer science, biotechnology and political science.

As such, there is a need in the art of word recognition for improved systems and methods that can recognize words in a data string as a function of context and meaning, and in particular there is a need for systems and methods that require less training data and less training time.

SUMMARY OF THE INVENTION

The invention avoids many of the problems of prior art systems by, in one aspect, providing systems and methods that perform semantic and linguistic analysis on the fly, as the data is needed, rather than relying on pre-computed statistical counts stored in predetermined bins. Accordingly, the invention, in one aspect, provides systems and methods that perform semantic analysis by analyzing language knowledge represented as, in one example, raw text, and employing the language knowledge for dynamically computing the semantic similarity between the words in a "sample passage" and the words in the "current passage" being analyzed.

In one aspect, the invention provides word recognition systems that operate to recognize an unrecognized or ambiguous word that occurs within a passage of words. Using known techniques, the system can offer several words as choice words to replace the unrecognized word. The system can select the best choice word by using the choice word to extract from a reference source sample passages of text that relate to the choice word. For example, the system can select the dictionary passage that defines the choice word or, if the choice word represents a phrase of two or more words, the system can select a dictionary passage that defines one of the words in the phrase. The system then compares the selected passage to the current passage, and generates a score that indicates the likelihood that the choice word would occur within that passage of text. The system can select the choice word with the best score to substitute into the passage.

Accordingly, the present invention provides systems and methods that represent language knowledge as actual sequences of text. In other examples, the language knowledge may be represented by a passage of raw text selected from an encyclopedia. Those skilled in the art of computer science will understand that there are other equivalent embodiments which may use different data structures and different encoding of the same language knowledge. However, it will be understood by one of ordinary skill in the art of computer science that any such alternate embodiments and practices are equivalent to the embodiments taught herein and can be practiced with the present invention without departing from the scope thereof.

To aid in understanding the description set forth herein, the following terms are explained.

The phrase "sample passage", as used herein, encompasses samples of text accessible to the recognition system during operation.

"Relevance indicator" as the term is used herein, encompasses dictionary headwords, lists of keywords, frequency counts of all words in a passage or any characterization of a sample passage which provides information for making a decision as to the relevance of a sample passage for a word recognition operation.

The phrase "current passage", as used herein, is understood to encompass a passage of words or phrases that are being analyzed by the system or method and that includes at least one word to be recognized.

The phrase "current word", as used herein, is understood to encompass the word or phrase on which the system or method is operating to estimate a probability distribution given the other words which are known, or hypothesized, to be in the current passage.

The phrase "context words", as used herein, encompasses the other words in the current passage, which may be used by the system or method to estimate a probability distribution for the current word being analyzed. It will be apparent to one of ordinary skill in the art of speech recognition, that context words encompass words in the current passage which have been explicitly confirmed as correct by a system user, as well as words which have been predicted or hypothesized by the system during the recognition process.

"Word", as the term is used herein, may be a word or a phrase and may be spoken, written, or represented as electronic data signals. The term word may also encompass a tone, a character, punctuation symbols, numerals and any symbol expressive of one or more meanings such as an object, concept, condition, or action.

In one embodiment, the present invention includes word n-grams and category n-grams language models which can be selectively employed as additional sources of language knowledge. In one embodiment, the practice of this invention gets word and category n-gram knowledge by including appropriate short phrases among the selected sample passages. These short phrases are chosen if they contain a word or category n-gram which is shared by the current passage. With these short passages included in the selected set, it will be seen that n-gram like prediction can automatically become a part of the standard processing of this invention.

In another aspect, the invention provides methods and systems for simply and efficiently generating language knowledge, including generating lists of passages selected from one or more reference sources which can include a reference source that is accessed on-line. Accordingly, the present invention provides methods and systems for generating language knowledge in a form that allows portions of the language knowledge to be edited, adapted and updated independently from the other portions, thereby providing a context language model more easily updated to include new words, phrases or terms.

Additionally, the invention provides methods and systems for speech recognition, optical character recognition, machine translation, and other recognition applications. Word recognition methods and systems are described herein which serve to identify a word that occurs in a passage of words. The passage can be any word sequence including an utterance, a portion of handwritten text, a portion of typewritten text or other such sequence of words, phrases, numbers and characters.

In a further aspect, the invention is realized as a word recognition method that is implemented as a software module which controls a word recognition system that has access to an established reference source, such as a dictionary. The method can include a step of selecting from a reference source passages of words related to the choice words for the current word being recognized. To evaluate a choice word the method directs the system to access an established reference source, and select a passage or passages that contain language suitable to represent the semantic profile of the respective choice word. This semantic profile can represent the contexts, topics, themes and meanings that are associated with this choice word. For example, the choice word "car" can have a semantic profile that can include synonyms of the noun "car" such as "automobile" or "vehicle", as well as including words related to the topics associated with the word "car" such as "transportation" or "mechanic". In a further step, the system compares the words in the selected passages with the context words in the document or utterance containing the current word. Based on the comparison of the context words with the passage words, the method determines a probability signal or score that can indicate the likelihood that a choice word is the proper choice for the current word.

In one embodiment, the probability signal is generated by comparing the context words in the data string with the passage words associated with the choice word. The probability that a specific choice word is substantially similar to the current word being identified is increased if there is a match between either the choice word or one of its associated passage words and one of the context words in the data string. A choice word can be selected from the list of possible choice words by comparing the probability signals and selecting the probability signal that indicates the highest probability that the associated choice word is substantially representative of the current word being recognized.

In a further practice, a list of passages is selected from a reference text, e.g., a dictionary or encyclopedia, having information related to the respective choice word or one or more words that have a known association with the choice word. In one practice the system can select words from a selected passage in a reference source by comparing each word in the passage against a stored list of words. The stored list can include words determined to be particularly likely to represent a meaning, a topic or a subject. These words are generally referred to as content words. Content words can be selected from the passage associated with the choice word and placed in the list as words representing a likely context for the choice word. In an alternative practice, the system can select words from a passage selected from a reference source by comparing each word in a reference source passage against a stored list of words representing words determined to lack a strong relationship to any particular meaning, subject or topic. These words are generally referred to as function words and can represent articles, prepositions or other words that are not likely to be closely associated with any particular topic or theme. All non-function words can be selected from the passage and placed in the list of passage words to represent the semantic profile of the choice word.

In various embodiments, the reference source can be a dictionary, an encyclopedia, a thesaurus, an antonym dictionary, a medical dictionary, a legal dictionary, an on-line computer database or any suitable reference source that contains information related to the choice word, and that is preferably indexed in a manner that allows ready access to the relevant information. In one typical example, the reference source is a conventional dictionary that includes discrete passages of information, where each passage is indexed by a head word. The system can employ the head word as a relevance indicator, i.e., an indication as to whether the passage is a relevant source of language knowledge.

In a further embodiment of the invention, the reference source can include training lists that include a relevance indicator such as a single word and one or more words which have been shown, preferably by statistical analysis, to have an association with the relevance indicator. These training lists can be developed by any of the common n-gram language models including bi-gram and tri-gram models as well as long context models.

In a further embodiment of the invention, the choice words in a choice list are selected from a vocabulary list that represents a list of known words employed by the recognition system or method. In a discrete word recognition embodiment, the recognition system selects choice words from the vocabulary list by comparing each word in the vocabulary list to the current word being recognized and selecting from the vocabulary list those words that are most similar to the current word. The vocabulary list can include a list of specialized terms and phrases relevant to a particular topic such as medicine, law or other such topics. The comparison between the words in the vocabulary list and the current word can include a step of comparing acoustic characteristics of the current word being identified with an acoustic model of the vocabulary word to generate a signal that represents the acoustic similarity between the current word and the acoustic model of the vocabulary word. Alternatively, the step of comparing can include a step of analyzing an image of the current word to recognize pattern characteristics of the word and comparing the identified pattern characteristics against known models of pattern characteristics associated to the words in the vocabulary list. In other embodiments, the language characteristics of words in the vocabulary list can be examined to select choice words having language characteristics that match the language characteristics of the current word, such as selecting vocabulary words identified as adjectives or verbs.

In a further embodiment, the invention includes word recognition systems that include a word list generator that generates a list of passage words for one or more of the context words in the current passage. The word recognition system further includes a choice list generator for generating a list of choice words. A correlation element correlates the passage words with the choice words, and generates a correlation signal for one or more of the choice words. The correlation signal can represent the likelihood that the associated choice word is contextually related to the context words and to the current passage and is a proper choice for the current word being analyzed.

The invention will next be described in connection with certain embodiments; however, it will be clear to those skilled in the art of word recognition that various modifications, additions and subtractions can be made to the below described embodiments without the departing from the spirit or scope of the invention.

BRIEF DESCRIPTION OF THE DRAWINGS

The invention will be more evident upon reading the following description of certain preferred embodiments in conjunction with the accompanying drawings, in which.

DETAILED DESCRIPTION

Figure 1:
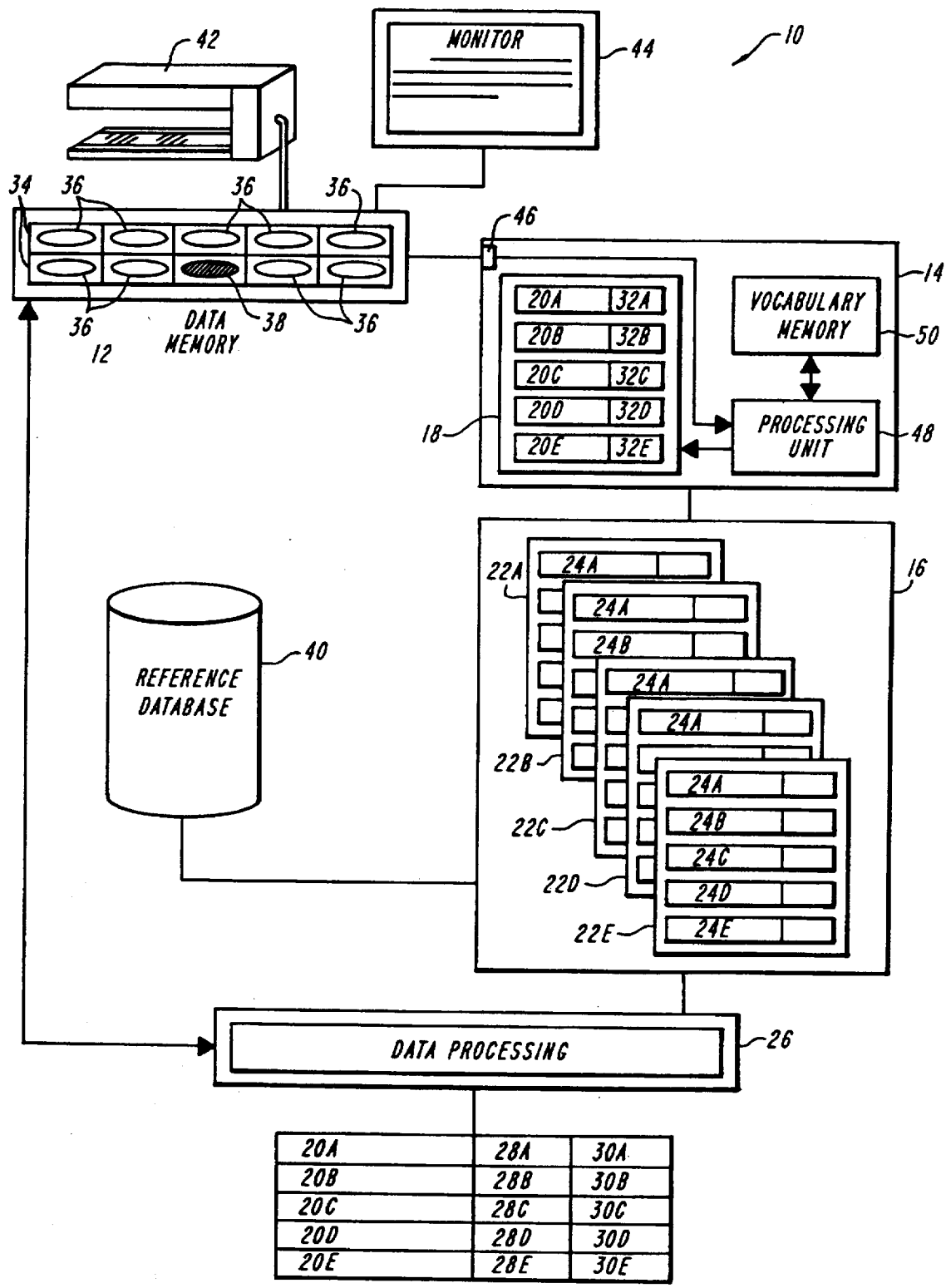
FIG. 1 is a functional block diagram of a recognition system according to the invention that selects a passage from a reference source to recognize an ambiguous word in a passage of words being analyzed.

FIG. 1 is a functional block diagram that illustrates a word recognition system 10 according to one embodiment of the invention. The system 10 includes a memory element 12, a choice list generator 14, a word list generator 16 and a data processor 26. Generally, the illustrated system 10 is a word recognition system that employs context recognition to recognize unknown words. The illustrated system 10 is adapted to recognize printed text and includes a scanning device for recognizing printed text, whether hand writing or type-face, other embodiments, described herein are adapted to function as continuous speech or a discrete speech word recognition systems.

The illustrated system 10 operates on words stored in the data string memory 12 which includes one or more context words 36 and at least one unrecognized, or ambiguous, word 38 which is currently being recognized by the system 10. The data string in the memory element 12 can represent the current passage of words being recognized by the system 10. The choice list generator 14 couples to the data string memory 12 and generates a plurality of choice words 20. The system 10 offers the list of choice words 20, as possible substitutes for the current word 38 being analyzed by the system 10. Optionally, the choice list generator 14 generates for each choice word 20 an associated probability signal 32 that indicates the likelihood that the choice word 20 represents the current word 38 being recognized.

In the illustrated embodiment, the word list generator 16 connects via a transmission path to a reference database 40. The reference database 40 can be electronic memory that stores passages of text in an addressable format which typically includes a relevance indicator, such as a dictionary head word, that provides entry point information for the word list generator 16. As will be explained in greater detail hereinafter, the word list generator 16 can employ the relevance indictor to select from the reference source 40 passages of text that are semantically relevant to one of the choice words 20. In one embodiment, the word list generator 16 selects individual words, passage words 24, to generate the lists of words 24A–24E. Each list of words 24A–24E, as will be explained in greater detail hereinafter, is a list of words that are likely to be seen or heard in association with the respective choice word 20. In an optional embodiment, the word list generator 16 adds word and category n-gram knowledge by including appropriate short phrases among the selected sample passages. These short phrases are chosen if they contain a word or category n-gram which is shared by the current passage. Accordingly, the invention includes n-gram like prediction capabilities automatically as a part of the standard processing of this optional embodiment.

The word list generator 16, depicted in FIG. 1, is one particular and optional embodiment of a passage list generator that can connect to the reference database 40 to identify passages of language knowledge which are semantically relevant to an associated choice word, or in other embodiments, context words. The passage list generator can employ relevance indicators to select from the reference source 40 passages of text that are semantically relevant to one of the choice words 20. For example, the passage list generator can connect to a reference database 40 that includes a dictionary. The passage list generator can select passages from the dictionary by comparing the choice words 20 to the dictionary headwords. Passages that have headwords that match, or substantially match, a choice word, are selected as a passage of text that is related to the matched choice word 20. The passage list generator can select the indicated passages as sources of relevant language knowledge and can each entire passage as a passage that is associated with the respective choice word. In this way, the passage list generator can identify, select, and store a relevant passage of text for comparing with the context words in the data string. It will be apparent to one of ordinary skill in the art that a selected passage can be stored as a list of words, an array of words, a pointer to an array of characters, or any other technique suitable for storing a passage of text. It will also be apparent to one of ordinary skill in the art, that the technique for storing the passage can depend on the application, and the information, such as word order, that is desired to be stored and analyzed.

The data processor 26 can couple to the data string memory 12 and the word list generator 16 to operate on the words in the data string memory 12 and in the word list memories 22A–22E to generate for one or more of the choice words 20A–20E a probability signal 28A–28E and an optional rank signal 30A–30E that ranks the choice words 20A–20E according to the likelihood of representing the current word 38 currently being recognized.

The system 10 illustrated in FIG. 1 is an optical character word recognition system according to the invention. The illustrated system 10 includes an optional document scanner unit 42 and an optional video monitor 44. Both the scanner 42 and the video monitor 44 can be conventional and commercially available units such as the types commonly used for scanning documents into a computer system and for displaying the scanned contents to a user. One such scanner is the AVR 3000, manufactured by AVR Technology of San Jose, California. The scanner 42 can further include, or connect to, a processor unit operating a conventional word recognition system that operates on each word in isolation from the other words in the document (not shown) for translating the received serial data into binary codes representative of letters, words and numbers. These codes can be stored as context words 36 in the data string memory 12.

The monitor 44 displays information to the system user. The information can include a visual representation of the words being analyzed as well as the list of choice words 20A–20E being analyzed by the system 10. However, the monitor element 44 can display additional information, such as system commands, the reference sources being employed to generate the word lists and other information. The monitor 44 can also include an audio element for providing audio representations of the information being displayed, thereby providing information to the visually impaired. Other display elements can be employed as the application demands, without departing from the scope of the invention.

The data string memory 12 can, in one embodiment, be a circuit card assembly of an electronic digital data random access memory that includes a serial interface for connecting to the optional scanner 42, for receiving serial data from the scanner 42. Alternatively, the data memory can be a hard disk memory, floppy disk memory, read only memory, optical disk memory, or other memory capable of storing electrical data signals representative of words and information.

The data string stored in memory 12 is a word sequence that includes one or more context words 36 and at least one current word 38 currently being recognized. Each context word 36 in the data string memory 12 is a symbol for expressing an object, action or condition. Furthermore, each word 36 can be a symbol for expressing punctuation, identification, quantity, musical notation and similar meanings that can be expressed, either visually, acoustically or otherwise, as a symbol. Each context word 36 is a symbol occurring in the data string stored in memory 12 that is associated with a word model employed by the recognition system 10. Word models are well known in the art of word recognition, and any of the techniques for modeling a word, including acoustic models, character pattern models and so on, can be practiced with the present invention.

Similarly, each current word 38 is a symbol or a sequence of symbols occurring in the data string stored in memory 12 that is not associated, or not confidently associated, with any word model or sequence of word models employed by the recognition system 10. The system 10 can detect the current word 38 by comparing the known word models to the current word 38 using any of the known methods for detecting unknown words in a data string, including spell checking against a dictionary.

The data string in memory 12 can be any data signal representative of a sequence or passage of words. The current word 38 being recognized can occur at the beginning, the end or in the middle of the data string in memory 12. The system 10 can optionally and selectively use the context words 36 that occur in the data string before or after the current word 38 to identify the current word 38. Additionally, as will be explained in greater detail hereinafter, the system 10 can use the context words 36 that occur in the data string in memory 12 within a select window of time or within a select number of words for identifying the current word 38.

Similarly, the choice list generator 14 can be a circuit card assembly that has a computer bus interface 46 for coupling via a computer bus transmission pathway to the data string memory 12. The computer interface element 46 can be a standard parallel computer bus interface for transmitting data between the generator 14 and the memory element 12. The choice list generator 14 can further include a processor unit 48 and a vocabulary memory 50. The processor unit 48 can connect via transmission lines to the computer interface 46, the vocabulary memory 50 and the choice list memory 18. The processor 48 can be a conventional data processing unit of the type commonly employed in data processing devices and can include a central processing unit and a program memory. The processing unit 48 can receive context words 36 via the computer interface 46 and can select from the vocabulary memory 50 words related to the word 36. The vocabulary memory 50 can be a conventional memory device of the type commonly employed in data processing devices. Such memory devices include random access memory cards, floppy disks, and optical storage memories.

In one embodiment of the invention, the processor 48 can store the entire stored vocabulary into the choice list memory 18. For example, in a limited vocabulary word recognition system, such as a system for dialing a telephone or for entering commands into a computer, the choice list generator 14 can offer as choices all the words employed by the recognition system by storing all the vocabulary words in a choice list memory 18 of sufficient size.

Similarly, the word list generator 16 can be a circuit card assembly having a computer interface for coupling via a computer bus to the choice list generator 14. The word list generator 16 can include a processing element such as the type previously described, and can have computer interface for coupling to the database 40. The word list memories 22A-22E can be memory units of the type previously described. The database 40, as will be explained in greater detail hereinafter, can be an electronically operated addressable memory of the type used for storing large volumes of data, in either a compressed or non-compressed format. In the illustrated embodiment, the word list generator 16 has a separate word list memory 22A-22E for each choice word 20A-20E. Each illustrated word list memory 22A-22E has five memory locations for storing five words 24A-24E. Each word 24A-24E in each word list memory 22A-22E is part of the semantic profile of one of the respective choice words 20A-20E. It should be apparent to one of ordinary skill in the art of computer engineering that other memory configurations and sizes, including dynamically varying memories can be practiced with the present invention without departing from the scope thereof. The data processor 26 can be a circuit card assembly that can include computer interfaces for coupling via a computer bus to the data string memory 12 and the word list generator 16.

It will be apparent to one of ordinary skill in the art of word recognition that each card assembly described above can be realized as a software module for operation on a conventional data processing system and that such an implementation can be achieved without departing from the scope of the invention.

In one operation, the system 10 generates the list of words 24 and compares, as will be explained in greater detail hereinafter, the words 24 with the context words 36 in the data string memory 12. In this illustrative embodiment, the system 10 employs a context recognition process to select a choice word. In other preferred embodiments that will be explained in greater detail hereinafter, the context recognition process is employed as part of a word recognition process that includes additional recognition procedures, such as acoustic modeling and character recognition. The data processor 26 can use the similarity between the words 24 and the words 36 in the data string memory 12 to select the choice word 20 that most likely represents the current word 38 being recognized. The system 10 can generate for the current word 38 a choice list 18 of known words 20A-20D that could be written into the data string memory 12 to represent the current word 38. As each choice word 20 represents a possible solution, the system 10 disambiguates between the possible solutions by generating the lists 22A-22E and comparing the related words 24A-24E for each choice word 20A-20E to the context words 36 in the data string memory 12. The occurrence of context words 36 in the data string memory 12 that are similar to one or more words 24, indicates a choice word 20 that is associated with the context of the passage stored in the memory 12. The illustrated system 10 can select the choice word 20 that is most closely associated to the context of the string stored in the memory 12 to represent the current word 38 being recognized.

As further illustrated by FIG. 1, the system 10 can select a choice word 20 as a function of the context of the data string in memory 12 and the data in context list memory 22. Each word 24 can represent a word that has a known relationship to the associated choice word 20. The depicted data processor 26 generates as a function of the data string in memory 12 and the data in the word list memory 22, a probability signal 28 that represents the likelihood that the associated choice word 20 is substantially representative of the current word 38. Additionally, the system 10 can rank the choice words 20 as a function of the probability signal 28 and generate a rank signal 30 that represents the likelihood, relative to the other choice words 20, that the associated choice word 20 is substantially representative of the current word 38 being recognized. As further illustrated by FIG. 1, the data processor 26 can connect via a bi-directional pathway to the memory 12 for replacing the current word 38 with the selected choice word 20. The selected choice word 20 can be substituted into the data string stored in memory 12 and employed by the word recognition system 10 as a context word 36, or sequence of context words, that makes up part of the context associated with any other current words 38 to be identified by the system 10. The monitor 44 can display the data string in memory 12, including the choice word 20 substituted into the data string 12 to replace the current word 38.

As depicted in FIG. 1, the choice list generator 16 can generate for each current word 38 a list of one or more choice words 20. Each choice word 20 is associated with a word model or sequence of word models and represents a symbol or sequence or symbols that can be substituted into the data string in memory 12 for the current word 38. The word list generator 16 generates a word list for each choice word 20 by storing in the associated word list memory 22 words 24 that together can represent a semantic profile for the associated choice word 20. The data processor 26 can compare the words 24 of the semantic profiles against the context words 36, to select the choice word 20 that best represents the word 38.

In the character recognition embodiment illustrated in FIG. 1, the current word 38 can be a partially recognized word having one or more recognized characters, such as letters. For example, the current word 38 could have an unrecognized first character succeeded by the recognized letter string "ORSE."

The current word 38 being recognized can be transferred via the bus interface 48 to the processing unit 48. The processing unit 48 can, in one example, analyze the known information about the current word 38 to select choice words 20A–20E from the vocabulary memory 50. Continuing with the above example of an current word 38 having the letter string "ORSE," the choice list generator 14, can match the identified string with stored vocabulary words. The word 38 could, for example, be associated with any of the vocabulary words gorse, horse, norse, morse, or worse, stored in the vocabulary memory 50. Each of these five vocabulary words can be one of the respective choice words 20A–20E stored by the processor unit 48 in the choice list memory 18.

Alternatively, the choice list generator 14 can select the choice words 20A–20E as a function of a static language model. In one embodiment the choice list generator can employ a uni-gram model to select choice words 20 as a function of their rate of occurrence in the English language. Each choice word 20 is associated with probability signal 32. The probability signal 32 can represent the fact that not all words are used with the same frequency in a given language, and in fact, some words are used much more commonly than others. The probability signal 32 can represent a probability distribution related to the likelihood that the associated choice word 20 would normally occur in a word sequence such as the data string in memory 12. The system 10 can generate a probability signal 32 for one or more of the choice words 20 by any of the statistical analytical techniques known in the art of language modeling. In this example, the system 10 employs a uni-gram language model that analyzes extensive amounts of training data, and measures, for each word in the language, the number of times the word occurs in the analyzed training data. Other language models, including the bi-gram and tri-gram models, can be used to generate the occurrence signals 32 and practiced with the depicted recognition system 10.

Alternatively and preferably, the probability signal 28 and additional probability information are employed by the data processor 26 to generate a signal that represents the overall likelihood that the choice word 20 is substantially similar to the current ambiguous word 38. In particular the data processor 26 can generate the signal as a function of the probability signal 28 and the probability signal 32. In one practice, a tuning procedure is employed to develop a set of weighted coefficients that the data processor 26 employs to combine the signals 28 and 32 and generate a combined signal that represents the likelihood that the associated choice word 20 represents the current word. Such a combined signal takes into consideration the acoustic characteristics of the current ambiguous word 38 and the context characteristics of the current ambiguous word 38. The data processor 26 can have a program memory that includes program instructions for generating the probability signal as a function of the two probability signals 28 and 32. Techniques for generating the probability signal given two constraints, the probability signal 28 and the probability signal 32 are well known in the field of mathematics and any of the techniques capable of generating a probability signal given a set of constraints, including the maximum entropy technique, can be practiced with the present invention without departing from the scope thereof. The processor 26 employs the probability signal to generate the rank signal 30.

Alternatively, the choice list generator 14 employs a long context language model that computes a probability signal 32 for each of the choice words 20A–20E as a function of the surrounding words in the data string stored in memory 12. Generally, context can be modeled by the context words 36 and the order of these words 36 in the data string in memory 12. The selection of surrounding words 36 that can make up the context depends on the application. For example, in a document the context can comprise all the current words 36 that precede and follow the current word 38 being identified. In a real-time speech recognition system, the context can be modeled from the words 36 in the utterance that precede the current word 38 being identified. A speech recognition system, employing a long context model can use these available words to generate the list of choice words.

In another embodiment of the invention, the system 10 employs a context window 34 that selects a particular set of the context words 36 in the data string stored in memory 12 and employs this selected set during the recognition process. In the embodiment, illustrated in FIG. 1, the choice list generator 14 places the context window 34 around the k words preceding the current word 38 being recognized. However, in alternative embodiments, the context window 34 can select the k words that follow the word 38 or the k words that surround the word 38. Other sets of words can be selected, such as words at the beginning of paragraphs that are relevant to the context of the data string in the memory 12 and the word 38, without departing from the scope of the invention. It should be apparent that k can be any integer number and its value depends on the application. For example, the long context model can employ long strings of data, for which an appropriate k value can range from 100–2000.

With reference again to FIG. 1, the depicted word list generator 16 can be explained. As discussed above, for each choice word 20A–20E, an associated word list 22A–22E can model the likely contexts in which the choice word 20 would occur. The word list generator 16 can generate words 24 for storing in the word list memory 22 and the system 10 can compare the words 24 with the context words 36 and determine the likelihood that the word 20 represents the current word 38 currently being recognized.

The word list generator 16 can generate data for storing in the word list memory 22 by selecting words 24 that have a semantic association with the choice word 20. In one embodiment, the word list generator 16 employs a heuristic approach to select words 24. In a first step, the generator 16 selects a reference source 40 containing sample passages of raw text, i.e., language information, and data that are relevant to the corresponding choice word 20. Typically, the reference source 40 includes relevance indicators for each sample passage. Typical relevance indicators include dictionary and encyclopedia headwords, or the keyword lists associated with magazine and journal articles. The word list generator 16 can identify the contextually relevant sample passages by comparing the relevance indicators to the word being analyzed.

The reference database 40 can be a dictionary, thesaurus, antonym dictionary, medical dictionary, legal dictionary, scientific and engineering dictionary, or other type of reference source. Typically, the source 40 is one or more existing reference sources that include headword relevance indicators. However, it should be apparent to one of ordinary skill in the art that any database can be readily indexed by word to thereby create reference database 40 particularly suited for use with the invention. Such indexing programs include the program ZY Index manufactured by the company ZY Lab.

In one example, the generator 16 connects to a dictionary reference source 40. The dictionary reference source 40 can be a conventional software dictionary reference that includes discrete passages of text, with each passage indexed by a head word. Typically, each discrete passage represents a dictionary definition of the associated head word. The system 10 employs the head word as a relevance indicator which indicates whether the discrete passage contains information relevant to the choice word. The generator 16 selects passage words from one or more sample passages associated with a respective choice word 20. The selected passage words represent words that are likely to be semantically related to the respective choice word 20. Therefore, the semantics of the selected passage words 24 model the contexts that are likely to be expressed in a window 34 that surrounds the current word 38.

In one preferred embodiment of the invention, the reference source 40 comprises an on-line electronic database that is word indexed for addressably accessing subtopics of information. For example, a word recognition system 10 could maintain on-line the GROLIER'S ENCYCLOPEDIA sold by the Grolier's Electronic Publishing. The word list generator 16 can access interactively the encyclopedia passages related to the choice word 20. The word list generator 16 can select passage words from the selected encyclopedia passages semantically related to the choice word 20. For example, the generator 16 can select every content word in the first three sentences of a selected encyclopedia passage. A content word, as is generally known in the field of word recognition, is a non-function word, and can be a noun, verb or adjective. These words are generally considered in the field of word recognition to be more meaningful to context than function words, such as pronouns, articles and prepositions.

One important aspect of the invention is that the reference source 40 employed by the system 10 can contain information recorded in a different language from the language of the words being recognized. For example, the system 10 can be adapted for recognizing words in the Greek language. As described above, text can be scanned in by the scanner element 42 and context words 36 in the Greek language can be stored in the data memory 12 while current words 38 are processed by the system 10. As described above, the choice list generator 14 can generate for each current word 38 a list of choice words 20A-20E. The word list generator 16 can generate a context list 22 for each choice word 20A-20E. In one embodiment of the invention, the word list generator 16 can be adapted for accessing a reference database having information in the English language. For example, each choice word 20A-20E can be transmitted to the word list generator 16, which includes a conventional translation unit, so that an English language translation of each of the choice words 20A-20E can be generated by the word list generator using any of the known translation techniques, including bi-lingual dictionary databases, bi-lingual concordance lists and bi-lingual dictionaries produced by aligning text automatically. One such bi-lingual dictionary is described in the publication Brown et al., "A Statistical Approach to Machine Translation", Computational Linguistics, Vol. 16, No. 2, p 79-85 (1991).

The English language translation of each choice word 20 can be employed by the word list generator 16 to access the reference database 40 of information recorded in the English language. For example, the reference database 40 can be an English language version of the Encyclopedia Britainica. Alternatively, the reference database 40 can be a source of information, such as a database of English language patents, that may not be available in the native language of the document being analyzed.

As described above, the word list generator can select a plurality of passage words 24A-24E from the English language reference source 40 and can store the passage words 24A-24E in a word list memory 22A-22E. The word list generator 16 can then translate each of the English language passage words into a native language equivalent, such as a Greek language equivalent. The system 10 can continue as described above by comparing the translated passage words 24A-24E with the native language words 36 stored in the data memory 12. It should therefore be apparent to one of ordinary skill in the art of speech recognition, that the invention provides a system that includes semantic profiles of select words, and that these semantic profiles transcend the native language of the document being recognized. Therefore, the invention can employ reference sources that include, in part or in whole, information recorded in a language, or several languages, different from the language of the words being recognized.

The lack of sufficient native language reference information can also be addressed by an alternative embodiment of the word list generator 16 that includes a language model element adapted to generate a list of words strongly related to the context of the choice word 20. One model, previously described, can be the long context language model, for generating a list of words 24 shown to be strongly related to the choice word 20. In an off-line step, the long context model can analyze training data to develop for each word in the vocabulary a training list of strongly related words. The word list generator 16 can select these words, or a portion of these words, to represent the stored words 24. The short lists can be employed in a system that recognizes words in the same language, or can be translated using any of the known techniques, into a different language for use with a system that recognizes words in a different language from the native language of the developed context lists.

The data processor 26 can generate the probability signal 28 as a function of the data string in the memory 12 and the data in the word lists memory 22. In one embodiment, the processor 26 compares and generates the probability signal 28 as a function of the co-occurrence of words stored in the list memory 22 and the data string in the memory 12. The probability signal can be generated by counting the number of matches between distinct words in the word list and distinct context words. For example, if the word HORSE appears as a context word 36, then the occurrence, any number of times, of the word HORSE in a passage generates a word count of one. A choice word that is associated with passages that include many of the context words, is probably a good choice. Alternatively, each matched word can be weighted by a frequency count representative of the frequency with which it occurs in the selected passage or by the frequency with which it occurs as a context word 36. Additionally, the significance of each word match between a context word 36 and a word in a passage can be weighted by the word distance between the context word and the choice word 20 associated with the passage. Moreover, the system can weight the matched words as a function of whether the matched words are content words or function words. Furthermore, the probability signal can be adjusted upon detection of matching n-grams between a series of context words and a series of passage words. However, it will be apparent to one of ordinary skill in the art of word recognition that many known techniques can be employed to generate the probability signal 28. Any of these methods, or variations thereof, can be used without departing from the scope of the present invention.

In an optional step, the data processor 26 can order the choice words 20 as a function of the probability signal 28, and generate a rank signal 30 that identifies the order of each choice word 20A–20E. The choice words 20A–20E, can be displayed as a menu of choices on the optional monitor 44. The operator of the word recognition system 10 can select a choice word 20 from the menu to confirm a substitute for the current word 38 being recognized. Alternatively, the word recognition system 10 can select the choice word 20 with the highest probability signal 28 or rank signal 30 to substitute for the current word 38 currently being recognized. In a preferred yet optional embodiment, the data processor 26 stores a user-selected probability threshold signal that represents a probability indicating sufficient confidence that the choice word 20 represents the current word 38 being recognized. The processor 26 can automatically select the choice word 20 having the highest probability signal 28 over the user-selected threshold. Alternatively, the processor 26 can display a menu of the choice words 20 to allow the user to select the choice word.

It should be readily understood to one of ordinary skill in the art of electrical engineering or computer science that system 10, illustrated as a block diagram of components, can be readily constructed as a system of circuit card assemblies, software modules or a combination of both. In particular, the data string memory 12, choice list generator 14, word list generator 16 and data processor 26 can be constructed as a system of machine code and program instructions for operating a word recognition system employing known techniques in the art of computer engineering.

It should also be apparent, from the above description, that in a recognition application, the actual words used in the current passage are not known, but in fact are being estimated by the system. In a word-by-word interactive system, there will be a left to right asymmetry—the preceding context words have been confirmed by the user, but the following context words have only been guessed or estimated. More generally, even the preceding context words may be uncertain. When there is uncertainty about some of the context words in the current passage, the preferred embodiment will analyze multiple alternate hypotheses for the current passage. The total estimated probability for any choice word in a particular position will be the total probability assigned to that choice word in each hypothesis for the current passage summed over all alternate hypotheses for the current passage.

Figure 2:
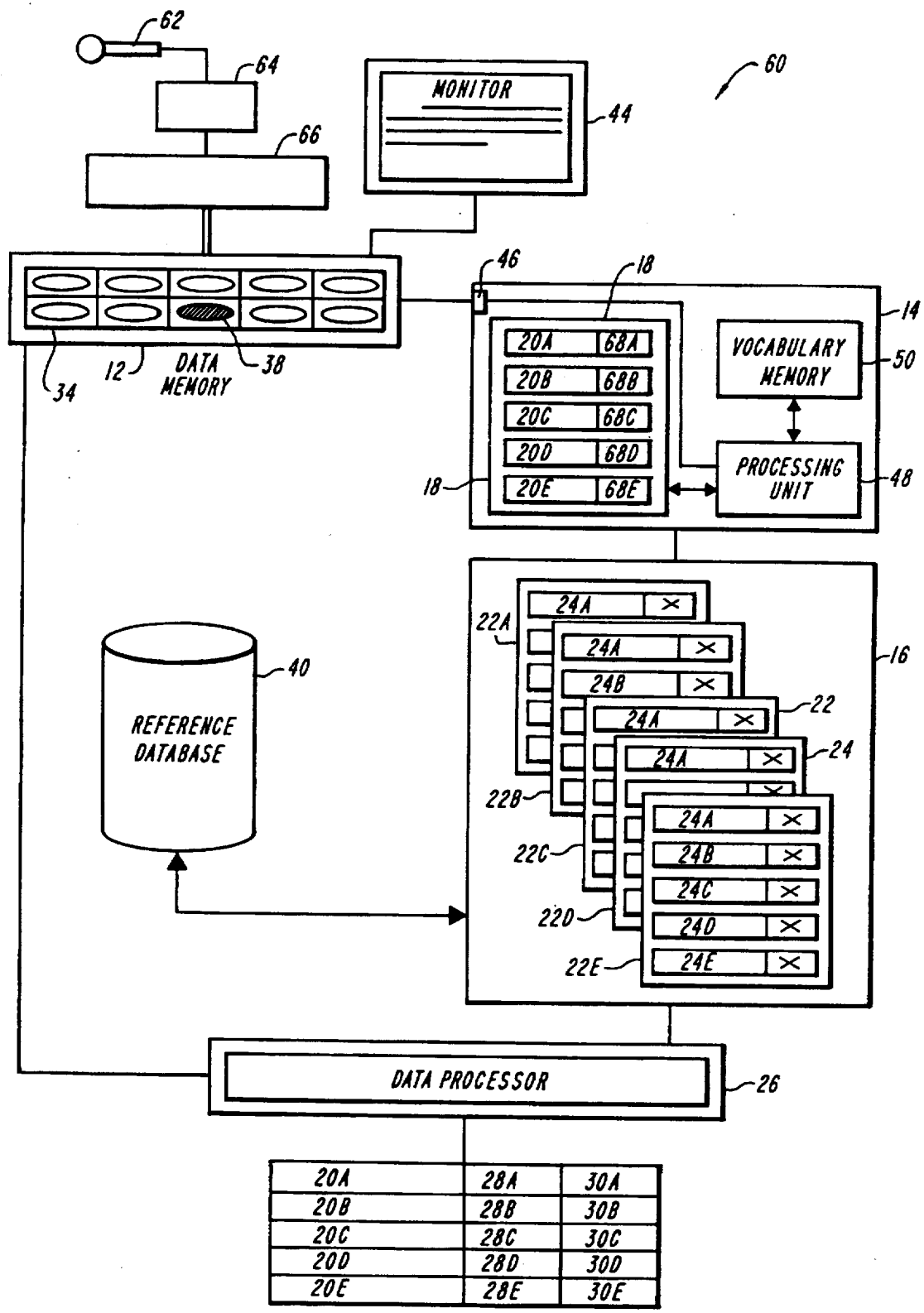
FIG. 2 is a functional block diagram of a speech recognition system according to the invention.

In FIG. 2, another embodiment of the present invention is shown, incorporating the word recognition system of the invention into a speech recognition system 60. The system 60 can include a speech input device 62 for acquiring speech signals, an A/D converter unit 64 for converting the acquired speech signals into digital data signals, and a speech analysis unit 66, for analyzing the speech signals and for recognizing, with a certain degree of probability, the words that make up the speech signals. Systems and methods for speech analysis that collect and analyze portions of speech are known and have been developed and described in patented publications by the assignee hereof. Such systems are described in U.S. Pat. No. 4,866,778, "Interactive Speech Recognition Apparatus", issued to James K. Baker and assigned to the assignee hereof. These and other speech recognition systems can be practiced with the present invention without departing from the scope thereof.

System 60 can detect words within portions of speech signals and compare these detected words to acoustic models of known words, or sequence of acoustic models of known words. The comparison leads to a probability signal that indicates the certainty that the detected word is substantially acoustically similar to the word associated with the acoustic model. A high degree of certainty indicates that the detected word has been recognized as the word associated with the corresponding acoustic model. The recognized word is presented as a context word 36 in the current passage stored in the data string memory 12. Alternatively, a low degree of certainty indicates that the detected word has not been confidently identified. This unrecognized word is represented as the current word 38 in the data string memory 12. The current word 38 is associated with a list of choice words 20A–20E. The choice list 18 can store the words 20 associated with the acoustic models from the vocabulary memory 50 which are acoustically similar to the current ambiguous word 38 being identified. Each choice word 20A–20E can have a corresponding acoustic probability signal 68A–68E that represents the degree of certainty that the word 20 associated with the acoustic model is substantially representative of the current word 38 being recognized. Additionally, the probability signal 68A–68E can represent the acoustic model probability adjusted by an n-gram probability, or any suitable language model.

The speech recognition system 60 depicted in FIG. 2 includes, in addition to the speech input device 62, the A/D converter 64 and the speech analysis unit 66, a data memory 12, a choice list generator 14, a word list generator 16, a data processor 26, an optional reference database 40, and an optional monitor unit 44. As illustrated in FIG. 2, the memory 12 can connect via a transmission path to the speech analysis unit 66. The memory 12 can receive analyzed speech data signals from unit 66 that represent the voice signals spoken into the input device 62. The analyzed speech data signals can include context words 36 and current words 38. The current words 38 can in this embodiment represent spoken words that contain insufficient information for the analysis unit 66 to determine, or determine with a sufficient level of confidence, a word model that can be associated with that word 38. As further illustrated by FIG. 2, the optional monitor 44 connects to the data memory 12 for displaying the data string of context words 36 and current words 38 stored in the memory 12. The data memory 12 can connect via a transmission path to a computer interface 46 in the choice list generator 14. The choice list generator 14 can contain choice list memory 18, a processor 48 and a vocabulary memory 50.

The word list generator 16 can connect via a transmission path to the choice list generator 14 and can connect to an optional reference database 40 via a second transmission path. The word list generator 16 can have word list memories 22 each having storage elements 24 for storing a word.

The data processor 26 can connect via a transmission path to the word list generator 16 and via a transmission path to the data memory 12. The data processor 26 can generate a probability signal 28 representative of the likelihood that one of the choice words 20 substantially representative of the current ambiguous word 38 and the memory 12. Optionally the data processor 26 can generate a rank signal 30 representative of the probability as a function of the acoustic language model and the context model that the choice word is representative of the current word 38.

In the embodiment depicted in FIG. 2, the choice list generator 14 can be a circuit card assembly that couples via a computer bus interface to the data string memory 12. As previously described with reference to FIG. 1, the choice list generator 14 can also include a computer interface element 46 for transmitting data between the choice list generator 14 and the memory element 12 via the computer bus. In the depicted embodiment the data memory 12 can store and transmit to the choice list generator 14 information regarding the acoustic characteristics of the current word 38. The choice list generator 14 can include a processor unit 48 and a vocabulary memory 50 constructed to operate on the acoustic characteristics of a word. The processor 48 and vocabulary memory 50 can be constructed according to any of the known techniques for recognizing a word from acoustic characteristics of a speech signal and for storing an acoustic model of a spoken word or sound.

The processor 48 can implement any of the known techniques for selecting from a vocabulary of word models, a set of word models or a sequence of word models likely to represent an unknown or current word. Such systems and methods are described in U.S. Pat. No. 5,027,406 titled "Method for Interactive Speech Recognition and Training" and U.S. Pat. No. 5,202,952, titled "Large-vocabulary Continuous Speech Prefiltering and Processing System", both of which are assigned to the assignee hereof and incorporated herein by reference. For example, the present invention can be practiced as part of a continuous speech recognition system, such as the systems described in the above-referenced U.S. Pat. No. 5,202,952. As described in greater detail therein, these systems can include a stored vocabulary of word models. Utterances spoken into the microphone are temporarily segmented, and at least two non-successive segments are processed with respect to the vocabulary. A subset of word models is selected from the stored vocabulary based on predetermined criteria. The subset of word models defines a list of candidate words which are representative by a signal generated by the system of the invention. The list of candidate words can be used as a list of choice words 20, by the present invention. Accordingly, a continuous speech recognition system employing the context recognition process of this invention represents multiple operations of discrete speech recognition taking place in parallel. For simplicity and clarity, only one operation is described herein.

To generate the list of choice words 20 from a continuous speech utterance, the invention, in one form, generates a succession of frame data sets which begin at a frame start time. Each of the frame data sets represents successive acoustic segments of utterances for a specified frame period. The system also includes a vocabulary, trained into the system by the operator, which may be stored within the system as clusters. Each cluster includes a plurality of word models which are acoustically similar over a succession of frame periods. Each word model includes nodes representing the probability distribution for the occurrence of a selected acoustic segment from that word model in a segment of the speech to be recognized.

The system generates a cluster score which represents the likelihood whether the frames represent words in that word cluster. Cluster sets having cluster scores above a predetermined acoustic threshold are removed from further consideration.

The remaining cluster sets are then unpacked to identify the individual words from each identified cluster. At this point, the system can generate a word score for each unpacked word resulting from the first filter. The word score can, in one practice, represent the sum of the cluster score for the cluster from which the word was unpacked, and a static language model score generated by the above described method and system. This word score is used to identify those words which are below a second combined threshold to form a list of choice words 20. Preferably, the system generates a list of the best segmentation hypotheses, an N best list, and applies the context recognition scheme only to those hypotheses that have an acceptable likelihood of success. The choice words generated by this embodiment can represent phrases of one or more words. These choice phrases represent candidate word sequences which may represent the utterance being analyzed. Moreover, in this embodiment, the current word being analyzed in actually an utterance of speech which can represent one or more words. The choice list 20 generated by the system is a list of phrases that is sent to the data processor 26 for analysis by the context model system and method of the present invention. Additionally, the choice list generator 14 can incorporate along with these acoustic model matching techniques, other techniques as were described with reference to FIG. 1, including language model techniques.

Each of the illustrated choice words 20A–20E can be stored in the choice list memory 18 that can be constructed as a data memory for storing electrical data signals representative of machine-readable data. Preferably yet optionally, each choice word 20 can be associated with a probability signal 68, illustrated in FIG. 2 as stored in the choice list memory 18 as signals 68A–68E. The probability signals 68A–68E can represent the likelihood that the associated choice word 20A–20E is substantially representative of the current word 38 currently being recognized. In one embodiment of the speech recognition system 60, the probability signal 68A–68E can be generated as a function of the acoustic properties of the current utterance 38 being analyzed and the acoustic properties of the word models stored in the vocabulary 50. Such techniques for generating this probability signal 68A–68E are described in the references cited above.

The word list generator 16 can also be constructed as a circuit card assembly having a computer interface for coupling via a computer bus to the choice list generator 14. As described with reference to FIG. 1, the word list generator 16 can include a processing element and can optionally connect to a reference database 40. The word list generator 16 can select passages from a reference source, and optionally generate context words 24 for storing in the word list memories 22A–22E. The word list generator 16 can access via a transmission path the reference database 40 and can identify information in the reference database 40 that relate to the topic, theme, or subject of a choice word 20. The word list generator 16 can select from this identified information, one or more words that can represent the words 24A–24E. In the illustrated embodiment, the word list generator 16 generates data to store in the word list memories 22A–22E having one or more words 24. It will be apparent to one of ordinary skill in the art that the word list generator 16 can be modified to generate word lists for only select choice words 20, and can be modified to generate data for the word list memories 22 that store a predetermined number of words 24 that have certain characteristics. Such characteristics can include distance, in time, or word sequence, of the context word 24 from the choice word 20 in the database, or the number of times the word 24 occurs within the reference database 40 in relation to the associated choice word 20.

The reference database 40 can be an on-line database that is accessed by the word list generator 16 on the fly. Such databases include the Grolier's Encyclopedia previously described. Additionally, the reference database 40 can be a dictionary, thesaurus, antonym dictionary, medical dictionary, legal dictionary, scientific and engineering dictionary, or other type of reference source. Preferably the database 40 is addressable as a function of the choice word 20, however it should be apparent to one of ordinary skill in the art that any database can be readily indexed by word, for generating a reference database 40 suitable for use with the present invention. Such indexing programs include the program ZY Index manufactured by the company ZY Lab.

The data processor 26 connects via transmission paths to the memory element 12 and the choice list generator 14, and generates as a function of the context words in the memory element 12 and the passage words 24 in the word lists 22, a probability signal 28 representative of the likelihood that the choice word or phrase 20 substantially represents the utterance currently being recognized. The data processor 26 as previously described can be a processing unit of the type commonly used for processing digital data signals. The processor 26 can include a processing unit and a program memory for executing program instructions to operate the processing unit to manipulate the data in memory element 12 and the data stored in the word list memories 22A–22E. In one embodiment of the present invention, the data processor 26 performs a matching function to calculate the number of matched words between the context words 36 and the stored word or phrase 24. The relative frequency of matches between the context words 36 and the passage words 24, indicates the relative likelihood that the choice word or phrase 20 associated with the matched words 24, is substantially representative of the current ambiguous word 38. In one practice, the choice word 20 represents a phrase of one or more words that may represent the utterance being analyzed. The word list generator 16 can select relevant passages from the reference source 40 for each word in the choice phrase 20. The data processor 26 can compare the context words 36 with all the passages for all the words in a particular choice phrase, to determine the likelihood that the choice phrase represents the utterance being analyzed.

Alternatively and preferably, the probability signal 28 and additional probability information are employed by the data processor 26 to generate a signal that represents the overall likelihood that the choice word 20 is substantially similar to the current ambiguous word 38. In particular the data processor 26 can generate the signal as a function of the probability signal 28 and the probability signal 68. In one practice, a tuning procedure is employed to develop a set of weighted coefficients that the data processor 26 employs to combine the signals 28 and 68 and generate a combined signal that represents the likelihood that the associated choice word 20 represents the current word. Such a combined signal takes into consideration the acoustic characteristics of the current ambiguous word 38 and the context characteristics of the current ambiguous word 38. The data processor 26 can have a program memory that includes program instructions for generating the probability signal as a function of the two probability signals 28 and 68. Techniques for generating the probability signal given two constraints, the probability signal 28 and the probability signal 68 are well known in the field of mathematics and any of the techniques capable of generating a probability signal given a set of constraints, including the maximum entropy technique, can be practiced with the present invention without departing from the scope thereof. The processor 26 employs the probability signal to generate the rank signal 30.

Figure 3:
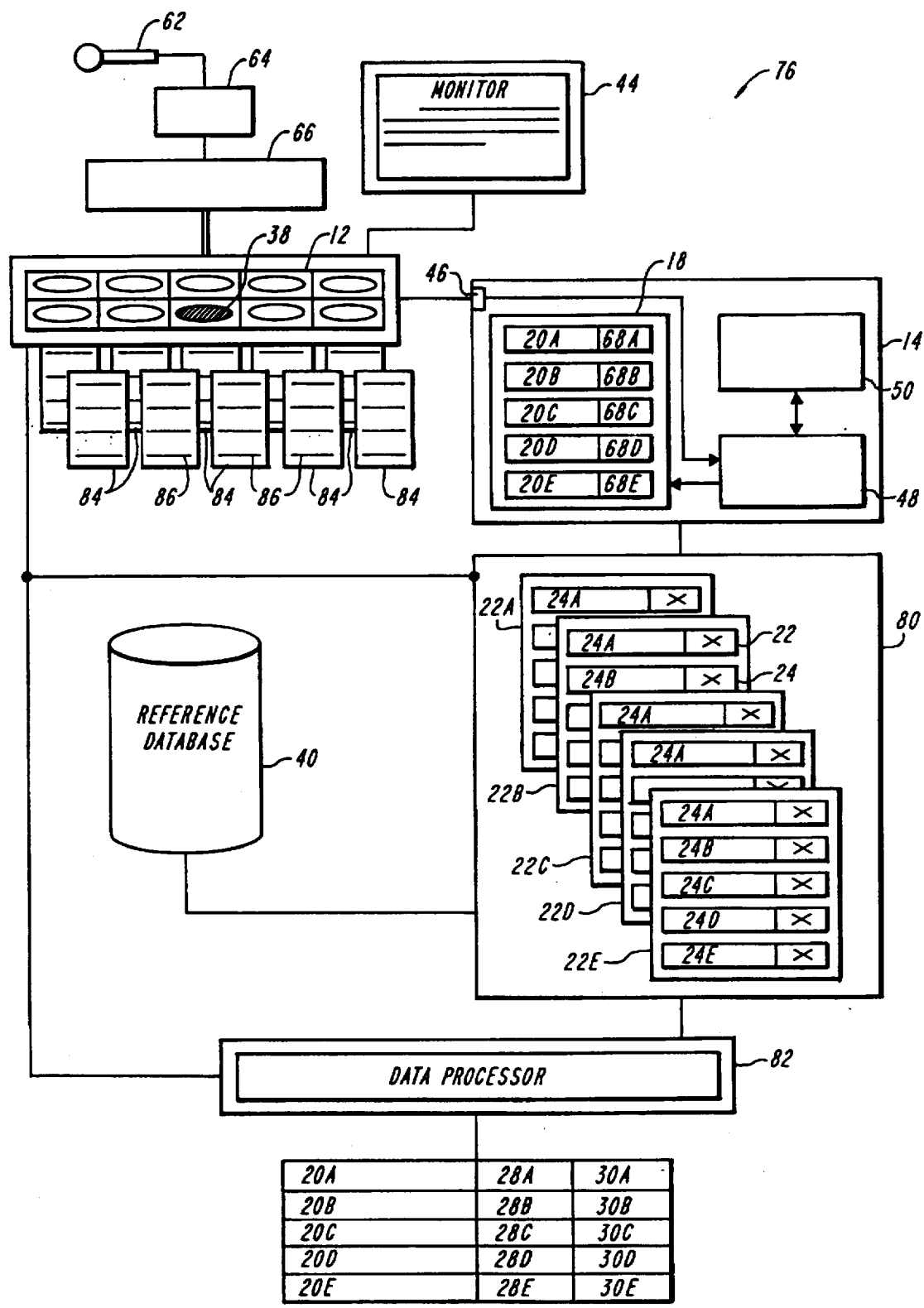
FIG. 3 is a functional block diagram of a word recognition system according to the invention that includes a word list generator that provides a list of passage words for each context word in the current passage being analyzed and for each choice word in a choice list.

FIG. 3 depicts an alternative embodiment of the invention that is a word recognition system 76 which includes the speech input device 62, an A/D converter 64 and the speech analysis unit 66 depicted in FIG. 1. Additionally, an optional monitor 44 connects to a data memory 78 and can display the context words 36 and the current words 38 stored in the memory 78. The system 76 further includes a choice list generator 14 that includes a choice list memory 18 for storing choice words 20A–20E and for optionally storing a probability signal 68A–68E. The choice list generator 14 further includes the computer interface 46, a processing unit 48 and a vocabulary memory 50. System 76 further includes a word list generator 80 that has word list memories 22A–22E for storing words 24. The word list generator 80 connects to an optional reference database 40, connects to the memory 78 and connects to a data processor 82. The data processor 82 connects to the memory 78 and generates probability signals 28A–28E and optionally 30 for each choice word 20 generated by the choice list generator 14.

In the illustrated embodiment the memory element 78 connects via a transmission path to the speech analysis unit 68 and a via transmission path to the optional monitor 44. As illustrated in FIG. 3, the memory element 78 includes storage elements 84 that store for each context word 36 a list of words 86. As further illustrated by FIG. 3 the memory element 78 connects via transmission paths to the list generator 80. In the embodiment depicted, the word list generator 80 generates for each context word 36, as previously described, list of passage words 86 that can be stored in the memory element 84 associated with a particular context word 36. In a preferred embodiment of the invention the memory element 78 is a digital data random access memory for electronically addressably reading, writing and storing data. The memory element 78 can be a sequential memory having a first memory register bank for storing the context word 36 and having a second register bank 84 for storing the list of passage words 86 associated with the context word 36 in the first register bank. The memory element 78 can have a computer interface for connecting to a computer bus and for transmitting information to the computer interface 46 of the choice list generator 14.

The choice list generator 14 can be constructed as previously described with reference to FIGS. 1 and 2, for generating a list of choice words 20A–20E that can be stored in choice list memory 18. The choice list generator 14 can use language models, including the long context model, unigram, bi-gram, tri-gram and special language models as well as acoustic model matching, for selecting from the vocabulary memory 50 the choice words 20A–20E. Additionally the processor element 48 of choice list generator 14 can generate a probability signal 68A–68E representative of the likelihood that the choice word is substantially similar to the current ambiguous word 38 being recognized. The processor element 48 of choice list generator 14 can generate the signals 68A–68E as a function of the acoustic model characteristics, language model characteristics, or combinations of both, according to known techniques in the art of probability statistics and word recognition.

The word list generator 80 connects via a transmission path, such as a computer interface, to the memory element 78 and optionally connects via a transmission path to the reference database 40. The word list generator 80 can operate as previously described to select words 24 for one or more of the choice words 20A–20E and for storing these words in the word list memories 22, each associated with a respective form of the choice word 20A–20E.

The data processor 82 can include a processing element, such as a conventional data processing unit for processing digital data signals, that can generate probability signals 28A–28E as a function of the context words 36, the list of passage words 86 and passage words 24. In one embodiment of the present invention, the data processor 82 generates the probability signals 28A–28E by comparing the occurrence of passage words 24 within the data string that includes the context words 36 and the associated expanded list of context words 86. In one embodiment, the data processor generates a passage count signal, for each choice word, that represents the number of passages of context words that include that choice word. The passge count can be employed by the data processor as a wieghting factor for generating the correlation signal. Other systems and methods for generating the probability signals 28A–28E can be practiced with the invention without departing from the scope thereof. As explained with reference to FIG. 2 the data processor 82 optionally can generate a rank signal 30 that represents the likelihood, as a function of the context matching and acoustic model matching that a choice word 20 is substantially similar to the current word 38 currently being recognized.

In one alternative embodiment of the system depicted in FIG. 3, a machine translation unit, as previously described, provides for each choice word 20 a list of passage words in a second language. Further, a machine translation unit, as previously described, provides for each context word, a list of passage words 86 in the second language. The data processor 26 can then perform the comparison by comparing passage words which are recorded in the second language.

Figure 4:
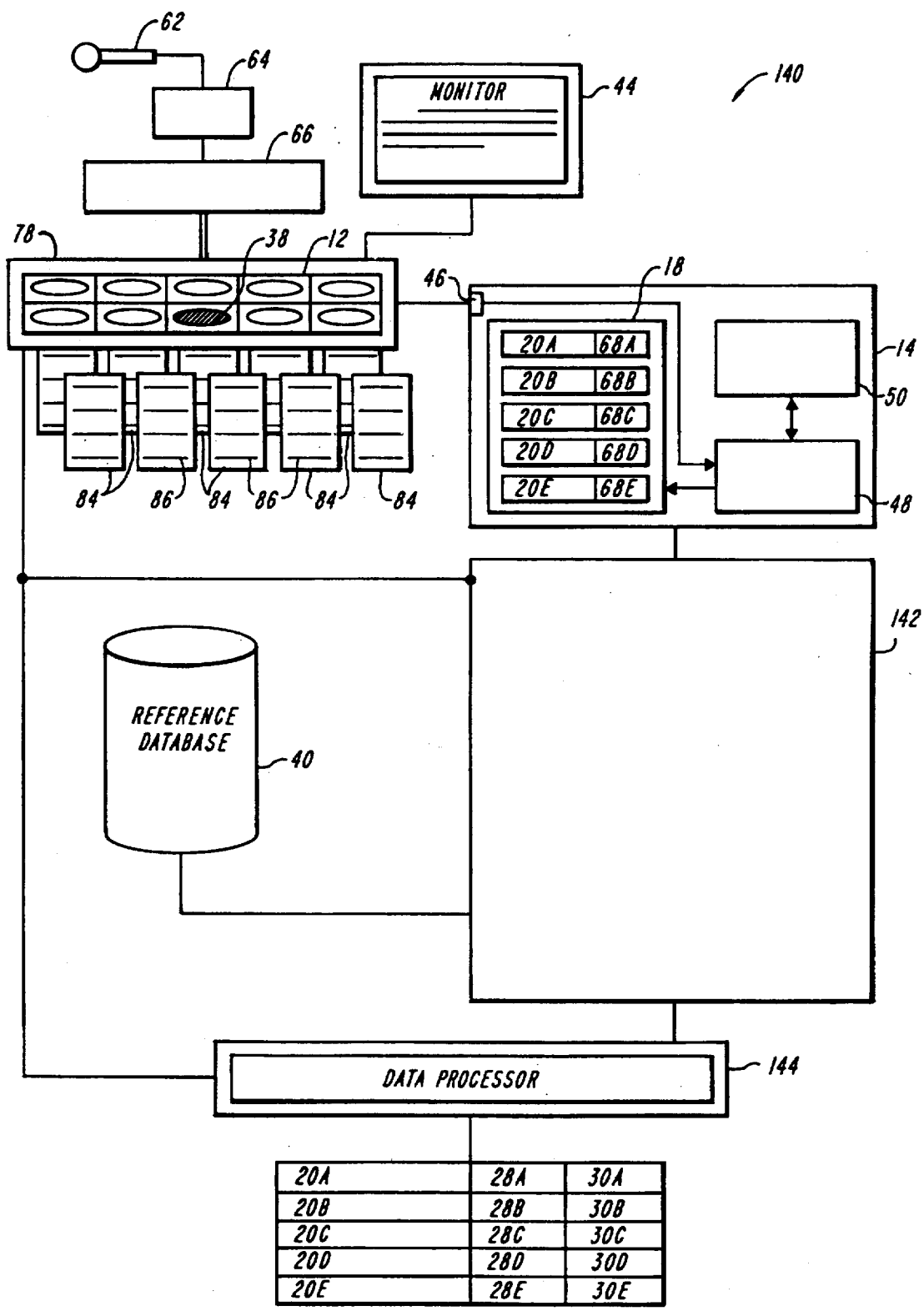
FIG. 4 is a functional block diagram of a word recognition system according to the invention that includes a word list generator that provides a list of passage words for each context word in the current passage being analyzed.

FIG. 4 illustrates a further alternative embodiment of the present invention. The system 140 depicted in FIG. 4 is similar to the system 76 depicted in FIG. 3, however, the system 140 of FIG. 4 includes a word list generator 142 that connects via transmission paths to the memory element 78 and that generates for each context word 36 in the memory element 78, a list of words that can represent the semantic profile of the context word 36. The expanded list of context words 86 can be stored in the memory elements 84 for use by the data processor element 144 that includes a processing element such as a conventional data processing unit for processing digital data signals and that is adapted to generate probability signals 28A–28E as a function of the known words 36, the list of words 86 and the choice words 20A–E.

As depicted by FIG. 4, the system 140 provides a word recognition system that employs context models of the context words 36 in a data string to select one of the choice words 20A–20E generated by the choice list generator 14. The data processor element 144 can include a program element that correlates the list of context words 86 with the choice words 20A–20E to select the proper choice for the current ambiguous word 38. As described above, the correlation between the words 86 and the choice words 20A–20E can include a heuristic process that selects a choice word 20A–20E by identifying occurrences of the selected choice word within one or more of the lists of words 86. Other techniques for selecting one of the choice words 20A–20E can be practiced with the present invention without departing from the scope thereof.

Figure 5:
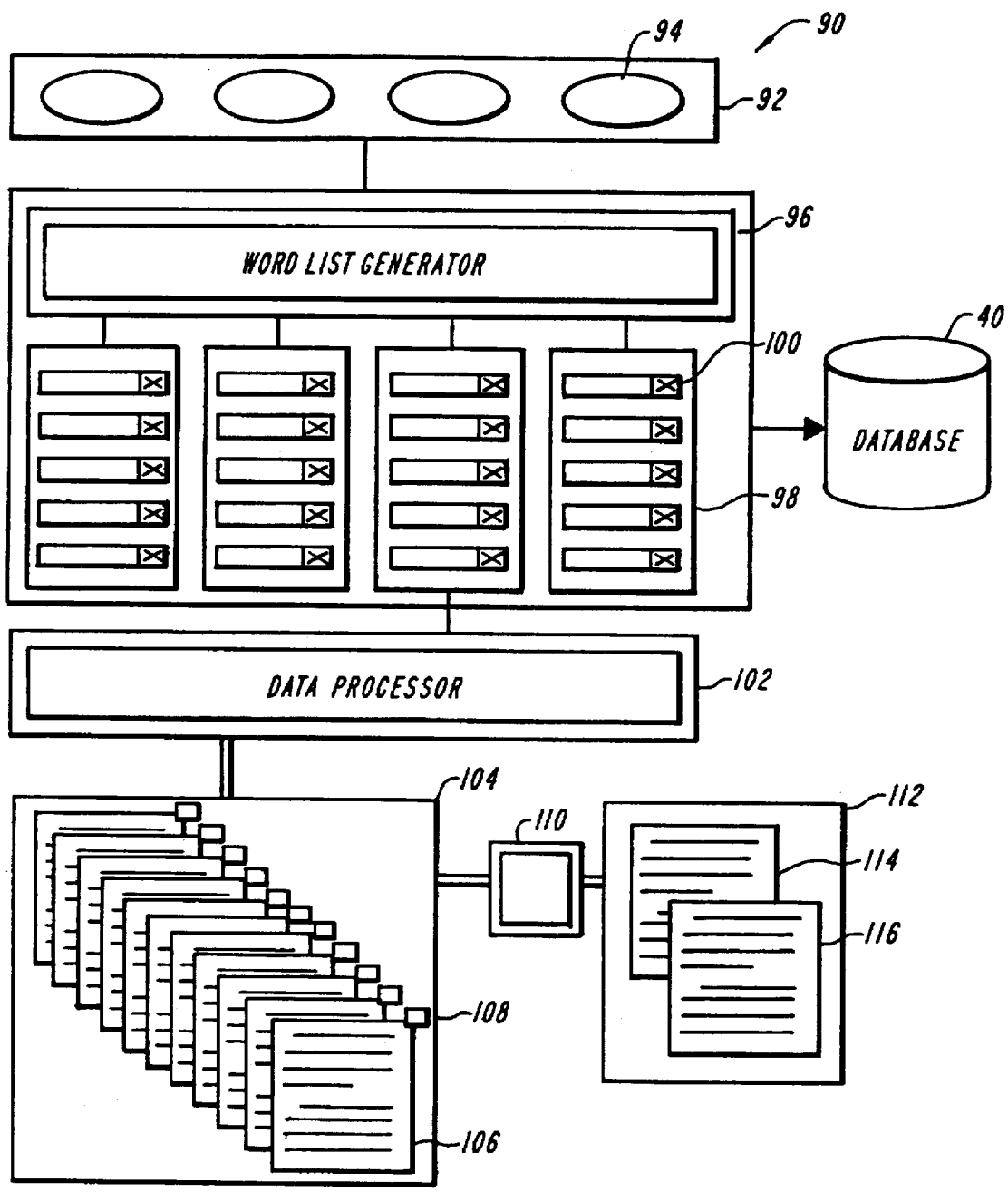
FIG. 5 is a functional block diagram of a database search system according to the invention that includes a word list generator for expanding a list of keywords to include words related to the contexts of the keywords.

FIG. 5 illustrates an alternative embodiment of the invention. FIG. 5 illustrates a database search system 90 that includes a data memory 92 for storing key words 94, a word list generator 96 for generating and storing in word list memory 98, words 100, and further includes a data processor 102 for searching a database 104 having a library of documents 106 wherein each document has optionally associated with it memory 108 for storing a probability signal. The system 90 further includes a document selection unit 110 for generating a file 112 of documents 114 having text 116 related to the keyword 94 or the context words 100.

The keyword memory 92 depicted in FIG. 5 can be a conventional digital data random access memory for storing the keywords 94 as electronic digital data signals. The keywords 94 can represent words, phrases, numbers and punctuation marks or any other symbol suitable for expressing an idea, action or object. Keywords 94 can be entered into data memory 92 according to any conventional methods or storing information in a data memory, such as by keyboard data entry or by speech recognition. Each keyword 94 is a known word having a known association with a word model stored in a word vocabulary employed by the system 90.

As illustrated in FIG. 5 the word list generator 96 connects via a transmission path to the data memory 92. The word list generator 96 receives keywords 94 from data memory 92 and generates for each keyword 94 a list of words 100 that are stored in word list memories 98. The word list generator 96 can include a processing unit in a vocabulary memory (not shown) as previously described with reference to FIG. 1. The word list generator 96 can connect via transmission path to an optional reference database 40. As previously described, the word list generator 96 can access the reference database 40 to select from information stored in the database 40, and related to a respective one of the keywords 94, a list of passage words 100. As described with reference to the earlier embodiments of the invention, the word list generator 96 can select passage words 100 as a function of the proximity of the passage word 100 to the keyword 94 within the reference source 40, as a function of the rate of occurrence of the passage word 100 within the information or related to the keyword 94, as a function of the relative position of the passage word 100, such as a topic sentence, or as a combination of these methods. Other methods for selecting the passage words 100 from the reference database 40 can be practiced with the present invention without departing from the scope thereof.

The data processor 102 connects via a transmission path to the word list generator 96. The data processor 102 can be a conventional digital data processing unit for manipulating digital data signals representative of information. The data processor 102 can further include a program memory for storing a sequence of program instructions and a processing unit for operating according to the program instructions in the program memory. As illustrated in FIG. 5 the data processor 102 connects via a transmission path to the document library 104. The data processor 102 can search the content of the documents 106 stored in library 104 and generate for each document 106 a probability signal 108 that the related document 106 contains information related to the keywords 94. Preferably the data processor 102 is of the type capable of performing Boolean searches. Such systems are known in the art of database searching, and any such system can be practiced with the present invention without departing from the scope thereof.

As illustrated in FIG. 5 the system 90 further includes a document selector 110 that selects one or more documents 106 from the library 104. The selector 110 connects via data pathway to the library 104 and to the file 112 for storing in the file 112 a set of documents 114 likely to obtain information related to the keywords 94. In one embodiment of the invention the selector 110 contains a processing unit having a user selected threshold signal stored in memory. The user selected threshold represents a confidence value for a probability signal that is stored in memory 108. The selector 110 can select any document 106 that has an associated probability signal 108 greater than the confidence signal in memory stored in the memory of the selector unit 110.

It will thus be seen that the invention efficiently obtains the objects set forth above, among those made apparent from the proceeding description. It will also be understood that changes may be made in the above construction and foregoing sequences and operations without departing from the scope of the invention. Accordingly, it is intended that all matters shown in the accompanying drawings be interpreted as illustrative rather than in any limiting sense. It is also to be understood that the following claims are intended to cover all of the generic and specific features of the invention as described herein, and all the statements of the scope of the invention which as a matter of language might be said to fall therebetween.

Having described the invention, what is claimed as new and secured by letters patent is:

1. A method for ascertaining an ambiguous word that occurs in a data string which includes at least one context word, comprising the steps of generating a list of one or more choice words to represent choices for the ambiguous word, providing a reference source having one or more passages, each passage including a relevance indicator and a series of words associated with the relevance indicator, selecting as a function of one of said choice words and said relevance indicators, at least one of said passages from said reference source, generating one or more correlation signals, as a function of said one or more selected passages, and at least one of said context words, to represent the likelihood that said choice word is a match for the ambiguous word, and selecting, as a function of said one or more correlation signals, at least one of said choice words to represent the ambiguous word being identified.

2. A method according to claim 1 for use with a continuous speech recognition system, wherein said step of generating said list of choice words, includes the steps of comparing select characteristics of a portion of speech to one or more word models each being representative of a word in a vocabulary, and selecting as a function of said comparison a subset of said words from said vocabulary.

3. The method according to claim 1 wherein said step of generating said correlation signals includes the further step of generating a list of passage words representative of one or more of the content words in said selected passages.

4. A method according to claim 1 wherein said step of providing a reference source includes the step of providing a reference source comprising a dictionary.

5. A method according to claim 1 wherein said step of providing a reference source includes the step of providing a reference source comprising an encyclopedia.

6. A method according to claim 1 wherein said step of selecting passages includes the step of selecting a choice word in a first language, translating said selected choice word into a second language, accessing a reference source comprising information recorded in the second language and selecting said passages therefrom, and translating said selected passages into the first language.

7. A method according to claim 1 wherein the step of selecting passages from a reference source includes the step of comparing the choice word with the relevance indicators, and selecting passages having a relevance indicator that contains a word that substantially matches the choice word.

8. A method according to claim 1 wherein the step of generating said correlation signals includes the step of determining, for each choice word, a word count representative of the number of distinct words in the associated passages that match with one of the context words in the data string and generating said correlation signal as a function of said word count.

9. A method according to claim 8 wherein said step of generating said correlation signals includes the further step of determining a frequency count for each passage word representative of the number of times the passage word occurs in a passage, and generating said correlation signals as function of said word count weighted by said frequency count.

10. A method according to claim 1 wherein said step of generating correlation signals includes the further steps of generating an occurrence signal for each of said choice words as a function of an n-gram language model and one or more of said context words to represent the likelihood that said choice word would be selected from a set of vocabulary words, and combining said occurrence signal with said correlation signal, representative of the likelihood that said choice word is a match for the ambiguous word, to adjust said correlation signal as a function of said likelihood of occurrence for said choice word.

11. A method according to claim 1 wherein said step of generating said correlation signals includes the step of adjusting each of said correlation signals as a function of a word count signal representative of the number of words separating a matching context word from the ambiguous word being recognized.

12. A method according to claim 1 wherein the step of generating the correlation signals includes the step of comparing the selected passages with the context words to detect a matching n-gram.

13. A method for ascertaining an ambiguous word that occurs in a data string that includes one or more context words, comprising the steps of generating a list of one or more choice words to represent choices for the ambiguous word, providing a reference source having one or more passages each of which includes a relevance indicator and a series of passage words associated with the relevance indicator, selecting as a function of each of said relevance indicators and said context words, at least one passage from said reference source for at least one of said context words, generating a correlation signal for each of said choice words as a function of said passages and said choice words, to represent the likelihood that a respective choice word is a match for the ambiguous word, and selecting as a function of said correlation signals, at least one of said choice words to represent said ambiguous word.

14. A method according to claim 13 for use with a continuous speech recognition system, wherein said step of generating said list of choice words, includes the steps of comparing select characteristics of a portion of speech to one or more word models each being representative of a word in a vocabulary, and selecting as a function of said comparison a subset of said words from said vocabulary.

15. The method according to claim 13 wherein said step of generating said correlation signal includes the further step of generating a list of passage words representative of one or more of the content words in said passage.

16. A method according to claim 13 wherein said step of selecting one or more passages includes the step of providing a reference source comprising a dictionary.

17. A method according to claim 13 wherein said step of selecting one or more passages includes the step of providing a reference source comprising an encyclopedia.

18. A method according to claim 13 wherein said step of selecting one or more passages includes the steps of selecting a context word in a first language, translating said selected context word into a second language, accessing a reference source comprising information recorded in the second language and selecting said one or more passages therefrom, and translating said selected passages into the first language.

19. A method according to claim 13 wherein the step of selecting passages from a reference source includes the step of comparing the context word with each of the relevance indicators, and selecting passages having a relevance indicator that contains a word that substantially matches the context word.

20. A method according to claim 13 wherein the step of generating said correlation signals includes the step of determining, for each choice word, a passage count representative of the number of context words having a passage that includes a word that matches the choice word and generating each said correlation signal, representative of the likelihood that said choice word is a match for the ambiguous word, as a function of said passage count.

21. A method according to claim 20 wherein said step of generating said correlation signal includes the further step of determining a frequency count for each choice word representative of the number of times the choice word occurs in the passages, and generating each said correlation signal as function of said passage count weighted by said frequency count.

22. A method according to claim 13 wherein said step of generating correlation signal includes the further steps of generating an occurrence signal for each of said choice words as a function of an n-gram language model and one or more of said context words to represent the likelihood that said choice word would be selected from a vocabulary of words, and combining said occurrence signal with said correlation signal, representative of the likelihood that said choice word is a match for the ambiguous word, to adjust said correlation signal as a function of said likelihood of occurrence for said choice word.

23. A method according to claim 13 wherein the step of generating said correlation signal includes the step of adjusting said correlation signal as a function of a word count signal representative of the number of words separating the ambiguous word from a context word having a passage that contains a word that matches the choice word.

24. A method for ascertaining an ambiguous word that occurs in a data string which includes one or more context words, comprising the steps of generating a list of one or more choice words to represent choices for said ambiguous word, providing a reference source having one or more passages, each passage including a relevance indicator and a series of passage words associated with the relevance indicator, comparing a respective one of said choice words with each said relevance indicator to select one or more of said passages from said reference source.

comparing one of said context words with each said relevance indicator to select one or more of said passages from said reference source, and generating a correlation signal for each of said respective choice words by correlating said passages of said context words with said passages of said respective choice words, to represent the likelihood that said choice word is a match for the ambiguous word.

25. A method according to claim 24 for use with a continuous speech recognition system, wherein said step of generating said list of choice words, includes the steps of comparing select characteristics of a portion of speech to one or more word models each being representative of a word in a vocabulary, and selecting as a function of said comparison a subset of said words from said vocabulary.

26. A method according to claim 24 wherein said step of providing a a reference source includes the step of providing a reference source comprising a dictionary.

27. A method according to claim 24 wherein said step of providing a reference source includes the step of providing a reference source comprising an encyclopedia.

28. A method according to claim 24 wherein the step of selecting passages from a reference source includes the steps of comparing the choice word with each said relevance indicator, and selecting passages having a relevance indicator that contains a word that substantially matches the choice word, and comparing a representative one of said context words with each said relevance indicator, and selecting passages associated with a relevance indicator that substantially matches the context word.

29. A method according to claim 24 wherein said step of selecting passages includes the steps of selecting a choice word and a context word, each being in a first language, translating said selected choice word and said context word into a second language, accessing a reference source comprising information recorded in the second language and selecting said one or more passages therefrom, and generating said correlation signal as a function of said selected passages recorded in the second language.

30. A method according to claim 24 wherein the step of generating said correlation signal includes the step of
determining for each choice word, a word count representative of the number of distinct words in the choice word passage that occur within a passage associated with one of the context words and generating said correlation signal as a function of said word count.

31. A method according to claim 30 wherein said step of generating said correlation signal includes the further step of
determining a frequency count for each passage word representative of the number of times the passage word occurs in a passage, and
generating said correlation signal as function of said word count weighted by said frequency count.

32. A method according to claim 24 wherein said step of generating a correlation signal includes the further steps of
generating an occurrence signal for each of said choice words as a function of an n-gram language model and one or more of said context words to represent the likelihood that said choice word would be selected from a set of vocabulary words, and
combining said occurrence signal with said correlation signal to adjust said correlation signal as a function of said likelihood of occurrence for said choice word.

33. A method according to claim 24 wherein said step of generating said correlation signal includes the step of
adjusting said correlation signal as a function of a word count signal representative of the number of words separating one of the context words from the ambiguous word being recognized.

34. A method according to claim 24 wherein the step of generating the correlation signal includes the step of comparing the selected passages associated with a context word and the selected passages associated with a choice word to detect a matching n-gram.

35. A method for ascertaining an ambiguous phrase that occurs in a data string which includes at least one context word, comprising the steps of
generating a list of one or more choice phrases, each of which represents one or more words, to represent choices for the ambiguous phrase,
providing a reference source having one or more passages, each passage including a relevance indicator and a series of words associated with the relevance indicator,
selecting as a function of one or said words in said choice phrase and each said relevance indicator, at least one of said passages from said reference source,
generating a correlation signal, as a function of said selected passage, and at least one of said context words, to represent the likelihood that said choice phrase is a match for the ambiguous phrase, and
selecting, as a function of said correlation signal, at least one of said choice phrases to represent the ambiguous phrase being identified.

36. A method according to claim 35 wherein the step of selecting passages includes the step of
selecting a passage for each of a plurality of the words in the choice phrase.

37. A method according to claim 35 wherein the step of generating a correlation signal includes the step of
generating for each choice phrase a word count signal representative of the number of words in the selected passages that match the words in the respective choice phrase.

38. A method according to claim 35 wherein the step of selecting passages from a reference source includes the step of comparing at least one word of the choice phrase with the relevance indicators, and selecting passages having a relevance indicator that contains a word that substantially matches said word of the choice phrase.

39. Apparatus for recognizing an ambiguous word that occurs in a data string which includes at least one context word, comprising
means for providing a list of one or more choice words to represent choices for said ambiguous word,
means for selecting a choice word and for accessing a reference source having one or more passages, each passage including a relevance indicator and a series of words associated with the relevance indicator, to provide a list of passage words having a known association with said selected choice word,
means for generating a correlation signal for each of said choice words as a function of said passage words, to represent the likelihood that said choice word is substantially similar to said ambiguous word, and
means for selecting, as a function of said correlation signal, at least one of said choice words to represent said ambiguous word.

40. Apparatus according to claim 39 wherein said means for providing a list of passage words comprises
means for selecting one or more of said passage words from an electronically addressable reference source having information related to said selected choice word.

41. Apparatus according to claim 39 wherein said choice word is in a first language and said reference source contains passages in a second language, further including
translating means for translating said selected choice word into the second language to provide a list of passage words in the second language.

42. In an apparatus that employs context for recognizing an ambiguous word that occurs in a data string which includes one or more context words, the improvement comprising
means for selecting a list of one or more choice words to represent choices for said ambiguous word, means for accessing a reference source, having one or more each passage including a relevance indicator and a series of words associated with the relevance indicator, to provide a list of passage words having a known association with said selected word, and
means for selecting, as a function of each relevance indicator, at least one of said choice words to represent said ambiguous word.

43. Apparatus for recognizing an ambiguous word that occurs in a data string which includes at least one context word, comprising
means for providing a list of one or more choice words to represent choices for said ambiguous word,
means for selecting said context word and for accessing a reference source, having one or more passages, each passage including a relevance indicator and a series of words associated with the relevance indicator, to provide a list of passage words having a known association with said selected context word,
means for generating a correlation signal for each of said choice words as a function of said passage words, to represent the likelihood that said choice word is substantially similar to said ambiguous word, and
means for selecting, as a function of said correlation signal, at least one of said choice words to represent said ambiguous word.

* * * * *

UNITED STATES PATENT AND TRADEMARK OFFICE
CERTIFICATE OF CORRECTION

PATENT NO. : 5,680,511
DATED : Oct. 21, 1997
INVENTOR(S) : Baker et al.

It is certified that error appears in the above-identified patent and that said Letters Patent is hereby corrected as shown below:

At column 30, line 40, please replace "more" with --more passages,--.

Signed and Sealed this

First Day of June, 1999

Attest:

Attesting Officer

Q. TODD DICKINSON

Acting Commissioner of Patents and Trademarks